G. F. RATH.
AUTOMATIC LUBRICATOR.
APPLICATION FILED MAY 26, 1911.
1,011,369.
Patented Dec. 12, 1911.
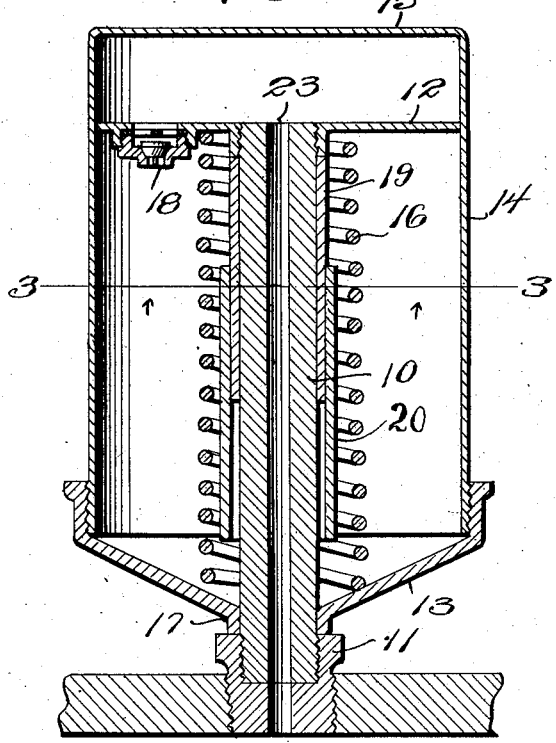
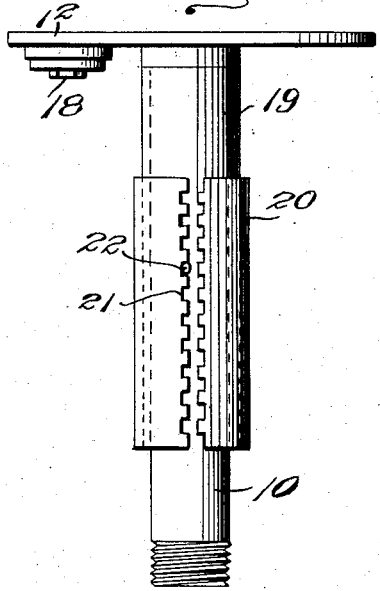
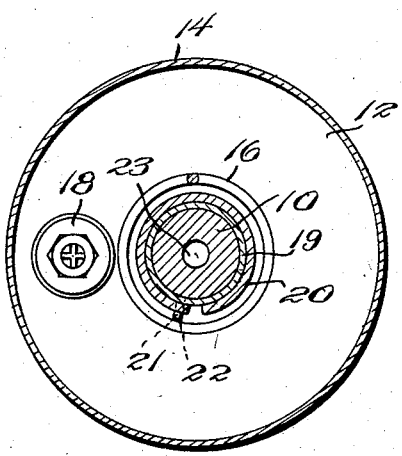
Inventor
G. F. Rath.
Witnesses

UNITED STATES PATENT OFFICE.

GUSTAV F. RATH, OF MARSHALL, MICHIGAN.

AUTOMATIC LUBRICATOR.

1,011,369. Specification of Letters Patent. Patented Dec. 12, 1911.

Application filed May 26, 1911. Serial No. 629,664.

*To all whom it may concern:*

Be it known that I, GUSTAV F. RATH, citizen of the United States, residing at Marshall, in the county of Calhoun and State of Michigan, have invented certain new and useful Improvements in Automatic Lubricators, of which the following is a specification.

This invention relates to devices for lubricating journals, more particularly the journals of wheels and like rotatable bodies, and may be applied to any of the various kinds of pulleys, wheels and other bodies which rotate upon shafts, and has for one of its objects to provide a simply constructed device which will operate automatically to provide the necessary lubricant to the journal.

Another object of the invention is to provide a device of this character which may be applied without structural change to pulleys and other rotatable bodies of various sizes.

Another object of the invention is to provide a device of this character which may be readily adjusted to control the amount of the lubricating material which flows therethrough.

For a full understanding of the invention, reference is to be had to the following description and accompanying drawings, in which:

Figure 1 is a sectional elevation of the improved device applied; Fig. 2 is a view of the stem and plunger detached together with the adjusting sleeves to illustrate the construction; and, Fig. 3 is a section on the line 3—3 of Fig. 1 looking in the direction of the arrow.

Corresponding and like parts are referred to in the following description and indicated in all the views of the drawing by the same reference characters.

The improved device comprises a tubular stem 10 connected at one end with the hub of the wheel or other rotatable body, and preferably through the medium of a threaded step nut 11, as shown in Fig. 1. At its upper end the stem 10 is provided with a plunger 12 which is rigidly connected to the stem as by being threaded therein, as shown. Surrounding the stem 10 and slidable thereon is a bottom member or inverted cap 13, and detachably connected to this cap, preferably by being threaded therein is a receiver or receptacle 14 closed at the outer end, as shown at 15. The receiver 14 fits over the plunger 12 which engages it oil tight on the interior. A coil spring 16 surrounds the stem 10 within the casing 14 and its inverted cap 13 and operates to maintain the central or collar portion 17 of the cap yieldably in engagement with the nut 11. The collar 17 is designed to engage the stem 10 oil tight and may be provided with a suitable packing for that purpose. A check valve represented conventionally at 18 is located in the plunger 12 and opens outwardly or toward the closed end 15 of the receptacle 14. By this arrangement a chamber compartment is formed between the plunger 12 and the closed end 15 of the receptacle. By this arrangement it will be obvious that the spring 16 will exert its force to maintain the receptacle 14 in its inward or downward position with the collar 17 bearing upon the nut 11, the object being hereinafter explained.

Surrounding the stem 10 at the end next to the plunger 12 is a sleeve 19, and slidable over the sleeve 19 is another and divided sleeve 20, the confronting edges of the divided sleeve being provided with a plurality of spaced notches 21, while the sleeve 19 is provided with a pin 22 for engagement one at a time with the notches. By this arrangement it will be obvious that the divided sleeve is adjusted upon the sleeve 19 by slightly rotating it and moving it lengthwise of the sleeve 19 and engaging the notches 21 with the pin 22, the extent of the adjustment being gaged by the number of the notches. By this means the "throw" of the receiver 14 upon the plunger is controlled as the receiver is limited in its movement by the distance between the lower or tread end of the sleeve 20 and the inner face of the inverted cap 13.

With a device thus constructed the operation is as follows: The nut 11 together with its stem 10 is inserted into the hub of the body to be lubricated and the receiver 14 separated from the cap 13 and filled with oil, the cap being located as shown in Fig. 1 upon the stem 10 and in engagement with the nut 11. The receiver 14 with its contents of the lubricating material is then restored to the cap 13, preferably by inverting the hub so that the cap and stem point downwardly. The check valve opening outwardly or toward the closed end 15 will retain the oil within the receiver 14 and between the plunger 12 and the cap 13 so long as the rotatable body remains stationary. When the body is rotated however, the centrifugal force will cause the oil to open the check valve 18 and fill the space between the plunger and the closed end 15 of the receiver and likewise cause the receiver to move outwardly upon its stem and against the force of the spring 16 thus permitting a larger quantity of the oil to flow through the check valve into the space outside of the plunger. When the rotatable body is stopped the force of the spring will restore the receptacle 14 to its normal position and thus force the oil which has passed into the compartment beyond the plunger through the duct 23 of the stem and upon the journal to be lubricated, and this forcing of the lubricant will take place no matter at what position or angle the lubricator may be stopped. This forcing of the lubricant through the stem will likewise take place when the motion ceases entirely.

The improved device may be constructed of any suitable material, but will preferably be of brass or the like, and may be inexpensively manufactured and applied wherever devices of this kind are required.

Having thus described the invention, what is claimed is:

1. In a lubricator a tubular stem adapted to be connected to the oil duct of a rotatable body, a plunger carried by said stem, a check valve in said plunger, and a receiver movable over said plunger.

2. In a lubricator a tubular stem adapted to be connected to the oil duct of a rotatable body, a plunger carried by said stem, a check valve in said plunger and a receiver movable over said plunger closed at the outer end and slidable at the inner end over said stem.

3. In a lubricator a tubular stem adapted to be connected to the oil duct of a rotatable body, a plunger carried by said stem, a check valve in said plunger, a receiver movable over said plunger and closed at the outer end and slidable at the inner end upon said stem, and a spring between said plunger and the inner end of the receiver.

4. In a lubricator, a tubular stem adapted to be connected to the oil duct of a rotatable body, a plunger carried by said stem, a check valve in said plunger, a receiver movable over said plunger and closed at the outer end and slidable at the inner end over said stem, and means for limiting the movement of said receiver upon said stem.

5. In a lubricator, a tubular stem adapted to be connected to the oil duct of a rotatable body, a plunger carried by said stem, a check valve in said plunger, a receiver movable over said plunger and closed at the outer end and slidable at the inner end upon said stem, a divided sleeve upon said stem within the receiver and having notches in its confronting edges, and another sleeve slidable upon the stem and provided with a pin for engagement in said notches one at a time for controlling the movement of the receiver upon the stem.

6. In a lubricator, a tubular stem adapted to be connected to the oil duct of a rotatable body, a plunger carried by said stem, a check valve in said plunger, a receiver movable over said plunger and closed at the outer end and slidable at the inner end over said stem, a spring between said plunger and the inner end of the receiver, a divided sleeve upon said stem within the receiver and having notches in its confronting edges, and another sleeve slidable upon the stem and provided with a pin for engagement in said notches one at a time for controlling the movement of the receiver upon the stem.

7. In a lubricator, a tubular stem adapted to be connected to the oil duct of a rotatable body and including a lateral stop shoulder, a plunger carried by said stem, a check valve in said plunger, a receiver movable over said plunger and including an inverted cap detachably connected thereto and slidable upon the stem and bearing normally upon said stop shoulder, and a spring between the plunger and the inverted cap portion of the receiver.

8. In a lubricator, a tubular stem adapted to be connected to the oil duct of a rotatable body and including a lateral stop shoulder, a plunger carried by said stem, a check valve in said plunger, a receiver movable over said plunger and including an inverted cap detachably connected thereto and slidable upon the stem and bearing normally upon said stop shoulder, a spring between the plunger and the inverted cap portion of the receiver, a divided sleeve upon said stem within the receiver and having notches in its confronting edges, and another sleeve slidable upon the stem and provided with a pin for engaging in said notches one at a time.

In testimony whereof, I affix my signature in presence of two witnesses.

GUSTAV F. RATH. [L. S.]

Witnesses:
W. T. PHELPS,
H. O. ALBAUGH.

Copies of this patent may be obtained for five cents each, by addressing the " Commissioner of Patents, Washington, D. C."